US008650214B1

(12) United States Patent
Wilhelm

(10) Patent No.: US 8,650,214 B1
(45) Date of Patent: Feb. 11, 2014

(54) DYNAMIC FRAME BUSTER INJECTION

(75) Inventor: Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 2652 days.

(21) Appl. No.: 11/121,786

(22) Filed: May 3, 2005

(51) Int. Cl.
G06F 7/00 (2006.01)
G06F 17/30 (2006.01)
G06F 17/00 (2006.01)

(52) U.S. Cl.
USPC .............................. 707/782; 707/769; 726/2

(58) Field of Classification Search
None
See application file for complete search history.

(56) References Cited

U.S. PATENT DOCUMENTS

| | | | |
|---|---|---|---|
| 6,029,245 A | 2/2000 | Scanlan | |
| 6,895,402 B1 | 5/2005 | Emens et al. | |
| 7,093,279 B2 * | 8/2006 | Tretheway et al. | 726/3 |
| 2003/0135504 A1 | 7/2003 | Elvanoglu et al. | |
| 2004/0172551 A1 | 9/2004 | Fielding et al. | |
| 2004/0198456 A1 | 10/2004 | Kelkar | |
| 2005/0071181 A1 * | 3/2005 | Christ et al. | 705/1 |
| 2005/0120229 A1 | 6/2005 | Lahti | |
| 2006/0021031 A1 | 1/2006 | Leahy et al. | |
| 2006/0068755 A1 * | 3/2006 | Shraim et al. | 455/410 |
| 2006/0069697 A1 * | 3/2006 | Shraim et al. | 707/102 |
| 2006/0136294 A1 * | 6/2006 | Linden et al. | 705/14 |
| 2006/0239430 A1 * | 10/2006 | Gue et al. | 379/201.05 |
| 2006/0288220 A1 * | 12/2006 | Pennington et al. | 713/176 |
| 2007/0039038 A1 * | 2/2007 | Goodman et al. | 726/2 |
| 2007/0107053 A1 * | 5/2007 | Shraim et al. | 726/22 |
| 2007/0192853 A1 * | 8/2007 | Shraim et al. | 726/22 |

OTHER PUBLICATIONS

"WebSiteOwner Quick Search," Dec. 15, 2005, [online] [Retrieved on Sep. 8, 2005] Retrieved from the Internet<URL:http://websiteowner.info/tutorials/javascript/framebuster.asp>.
Emigh, A., "Online Identity Theft: Phishing Technology, Chokepoints and Countermeasure," ITTC Report on Online Identity Theft Technology and Countermeasures, Oct. 3, 2005, pp. 1-58.
"I Hate Frames Club," 2002, Bud Uglly Design, [online] [Retrieved on Jan. 29, 2008] Retrieved from the Internet<URL:http://buduglydesign.com/frame9806/f-java.htm>.
Wu, M. et al., "Do Security Toolbars Actually Prevent Phishing Attacks," CHI 2006, ACM, Apr. 22-27, 2006, 10 pages.

* cited by examiner

*Primary Examiner* — Pierre Vital
*Assistant Examiner* — Loan T Nguyen
(74) *Attorney, Agent, or Firm* — Fenwick & West LLP

(57) ABSTRACT

A parsing module receives a web page from a network. The parsing module identifies a frame embedded within the intercepted web page. The parsing module identifies information regarding the embedded frame. A collection module collects the identified information regarding the embedded frame and maintains such information in an exclusion list stored in a memory module. A lookup module intercepts a web page from the network before the web page reaches the client. The lookup module identifies information regarding this web page and accesses the memory module to determine if the identified information is included in the exclusion list. If the identified information regarding the web page is not included in the exclusion list, a modification module modifies the web page such that the web page will not be loaded on the client within a frame.

18 Claims, 7 Drawing Sheets

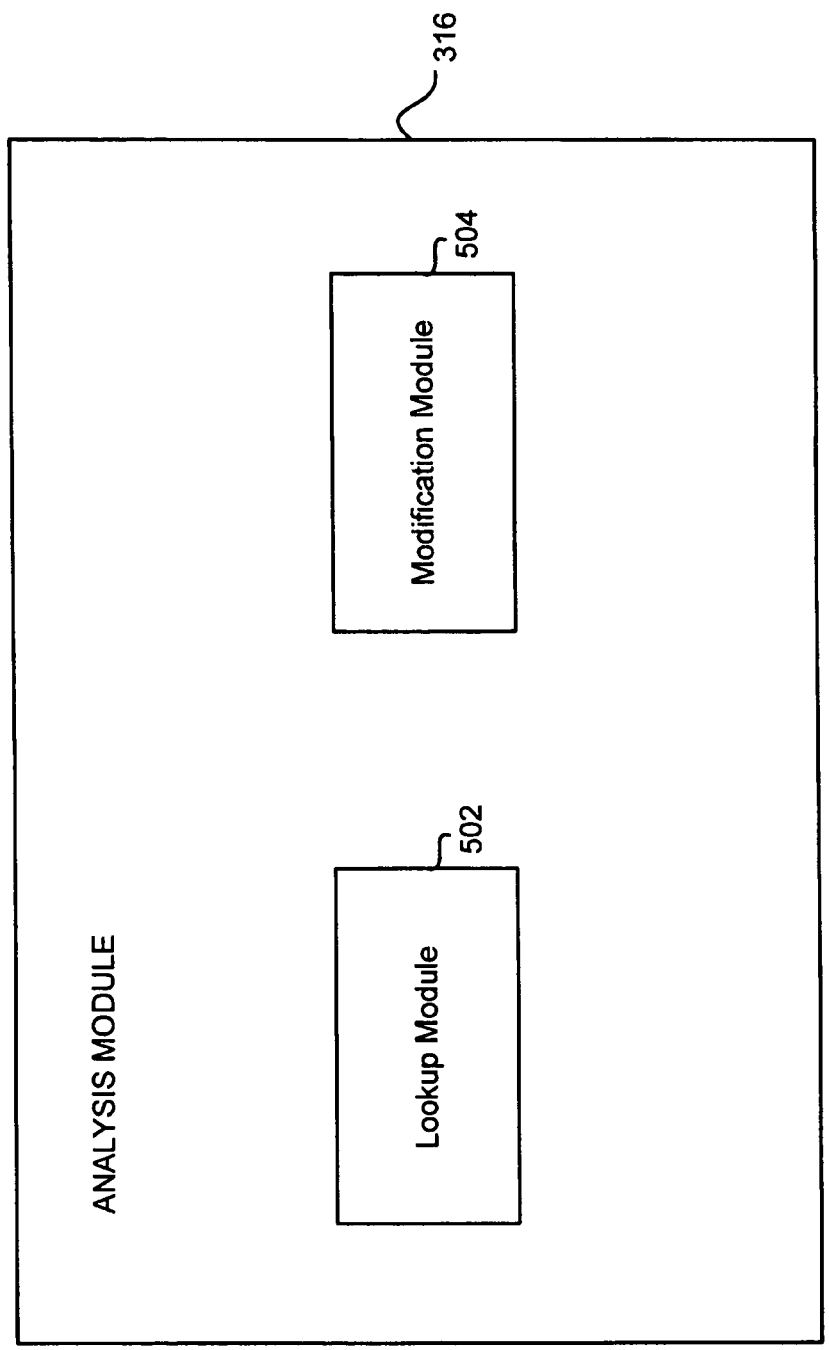

DYNAMIC FRAME BUSTER INJECTION

BACKGROUND OF THE INVENTION

1. Field of the Invention

This invention pertains in general to computer security and in particular to techniques for preventing a fraudulent party from mimicking a legitimate web site without expensive or complex revision of the web site.

2. Background Art

Internet fraud is a serious problem for both businesses and consumers. In particular, Internet users are under constant threat from various computer and network sources. For example, a fraudulent party may send an electronic mail to a user falsely claiming to be an established legitimate enterprise in an attempt to scam the user into surrendering private information that may be used for identity theft. The electronic mail directs the user to visit a web site where the user is asked to update personal information, such as passwords and credit card, social security, and bank account numbers, which the legitimate enterprise already possesses. The web site, however, is bogus and set up to steal the user's information.

To steal the user's information, the fraudulent party makes the bogus web site look authentic enough that the user will believe that he or she is submitting the information to a legitimate web site. To add extra apparent authenticity to the bogus web site, the fraudulent party may embed a legitimate page from a web site that he or she is trying to mimic within a frame of a fraudulent web page. For example, a fraudulent site may frame a web page in order to display dynamic content (e.g., a picture chosen by the user that is unknown to the fraudulent party) that cannot be copied to the fraudulent site. The fraudulent web site that frames a legitimate page may further induce the user to enter sensitive information into the fraudulent site's form. Alternatively, as the unwitting user logs in and browses through the legitimate web page contained in the child frame, a fraudulent web page residing in the parent window can use a script such as a JavaScript to redirect information that the user enters in the legitimate page to the fraudulent page.

To prevent such fraudulent framing of a web page, web developers have created "frame-busting" scripts that can be embedded in a web page. When a client machine loads a web page, a frame-busting script within the page determines if the web page is within a frameset (i.e., not the outermost frame). If the web page is within a frameset, the frame-busting script reloads the web page in the outermost frame. That is, the script "busts" the framed web page out of the enclosing page by setting the framed page as the parent window.

For a large and complex web site, however, it is difficult and costly to write and test a frame-busting script for each legitimate web page. For example, some web applications include web pages that are intended to legitimately appear within frames of another web page. In a complex web application, determining which web pages are intended to be within legitimate frames and which web pages are not in order to properly insert frame-busting scripts may be a time-intensive and cost-prohibitive task. Web developers have to be careful to avoid breaking existing applications by adding frame-busting scripts to web pages that can legitimately appear within a frame.

Therefore, there is a need for a technique that provides the protection of frame busting to resist a fraudulent web site without expensive or complex modification to a legitimate web application.

DISCLOSURE OF INVENTION

The above need is met by a security system that monitors network traffic to a client. The security system includes a monitoring module, an analysis module, and a memory module. The security system establishes an exclusion list for each user identifying web pages that can legitimately appear within a frame. In an embodiment of the invention, to establish the exclusion list, the monitoring module examines each web page that is sent to a client. For example, the parsing module parses the hypertext markup language (HTML) syntax of the web page to locate a frame tag. The parsing module further identifies information regarding an identified frame (e.g., a universal resource identifier (URI) such as a uniform resource locator (URL) of the framed web page) by parsing the located frame tag. A collection module collects the identified information regarding the frame and maintains such information in the exclusion list stored in the memory module. In an alternative embodiment of the invention, the security system establishes the exclusion list by receiving the exclusion list from a legitimate server for storage in the memory module.

The analysis module intercepts a web page from the network before the web page reaches the client. A lookup module identifies information regarding the web page (e.g., its URL) and accesses the memory module to determine if the identified information regarding the web page is included in the exclusion list. If the identified information regarding the web page is included in the exclusion list, the security system sends the web page to the client without modifying it. But if the identified information regarding the web page is not included in the exclusion list, a modification module modifies the web page such that the web page will not be loaded on the client within a frame. For example, the modification module may add a frame-busting module to the web page such that the web page will be busted out of any enclosing frame at the client.

BRIEF DESCRIPTION OF THE DRAWINGS

FIG. 5 is a high-level block diagram illustrating modules within an analysis module according to an embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
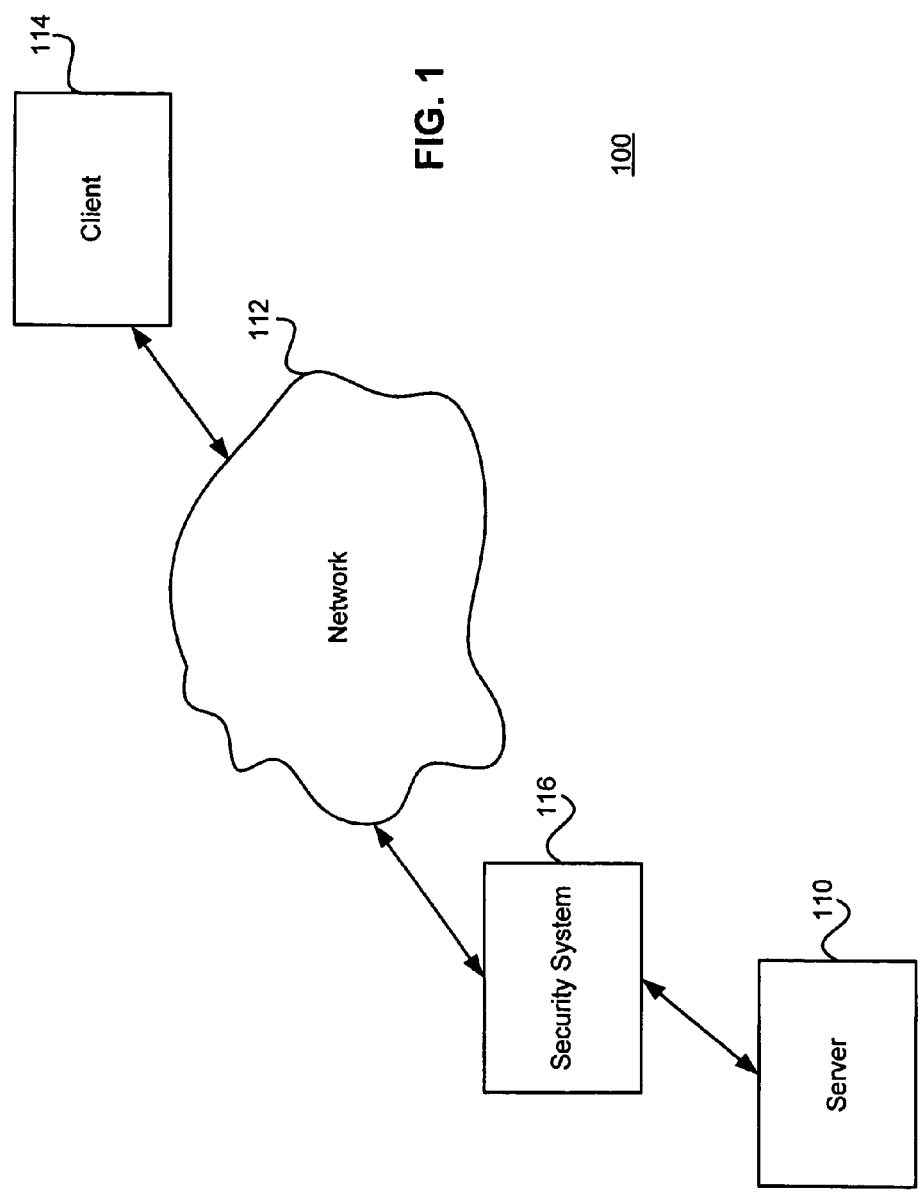
FIG. 1 is a high-level block diagram of a computing environment according to an embodiment of the present invention.

FIG. 1 is a high-level block diagram of a computing environment 100 according to an embodiment of the present invention. FIG. 1 illustrates a server 110 coupled to a network 112. The network 112 is also coupled to a client 114. The server 110 is coupled to the network 112 via a security system 116. Even though one client 114 is shown in FIG. 1, multiple clients 114 may be coupled to the network 112. Furthermore, multiple servers 110 may be coupled to the network 112 via the security system 116 for communicating with the client 114. In an alternative embodiment, the security system 116 is coupled to, or included within, the client 114 to serve as an interface between the client 114 and the network 112.

The security system 116 monitors transfers of information to and from the network 112. For example, the security system 116 may be a web application firewall, which is a hypertext transfer protocol (HTTP) proxy that inspects traffic to and from a web server (e.g., the server 110). Thus, the HTTP proxy is adapted to intercept a web page before the web page is rendered on the client 114 (e.g., by a browser). Alternatively, the security system 116 may also be a helper object plugged into a browser of the client 114. The helper object is adapted to intercept a web page and analyze the web page's HTML code. The helper object can also perform an action on the browser. For example, the helper object can detect the browser's typical events, such as a user action on the browser; access the browser's menu and toolbar and make changes; create windows to display additional information on the currently viewed page; and install hooks to monitor messages and actions.

In an embodiment of the invention, the security system 116 examines both upstream and downstream network traffic to look for security attacks on the client 114 and provides facilities for tracking a client user's identity and browsing history on a specific server.

The network 112 provides communications between and among the other entities illustrated in the computing environment 100 of FIG. 1. In one embodiment, the network 112 is the Internet and uses wired and/or wireless links. The network 112 may include a cellular telephone network or other data network having a peering point with the Internet. The network 112 can also utilize dedicated or private communications links that are not necessarily part of the Internet. The entities illustrated in FIG. 1 use conventional communications technologies such as the transmission control protocol/Internet protocol (TCP/IP) to communicate over the network. The entities of FIG. 1 also use conventional communications protocols such as the HTTP, the simple mail transfer protocol (SMTP), the file transfer protocol (FTP), etc. The entities can also engage in secure communications using technologies including the secure sockets layer (SSL), Secure HTTP and/or virtual private networks (VPNs). The communicated messages utilize conventional data encodings such as HTML, extensible markup language (XML), etc.

The server 110 can include one or more standard computer systems configured to communicate with the client 114 via the network 112. For example, the server 110 can include a web server, FTP server, or other technology that enables the server 110 to interact with, and provide content to, the client 114 via the network 112.

In one embodiment, the client 114 is a conventional computer system executing, for example, a Microsoft Windows-compatible operating system (OS), Apple OS X, and/or a Linux-compatible OS. In another embodiment, the client 114 is another device having computer functionality, such as a personal digital assistant (PDA), cellular telephone, video game system, etc.

According to an embodiment of the invention, the security system 116 monitors and analyzes a web page downloaded from the server 110 to the client 114. From the web page, the security system 116 identifies a list of framed pages embedded within the web page. The security system 116 then maintains information regarding these framed pages (e.g., their URLs) in an exclusion list.

If the security system 116 detects a web page from the network 112 whose URL is not included in the exclusion list, the security system 116 inserts a frame-busting module (e.g., a frame-busting script) into this web page such that the web page will be busted out of any enclosing frame at the client 114. Since the security system 116 dynamically maintains an exclusion list the URLs of web pages that can legitimately appear within a frame, the web pages that can be legitimately framed will not be modified by the insertion of a frame-busting module at the security system 116. Accordingly, web pages that can legitimately appear within frames will not be busted out of their enclosing frames at the client 114. But web pages that cannot legitimately appear within frames will be busted out of their enclosing frames by the frame-busting module.

Figure 2:
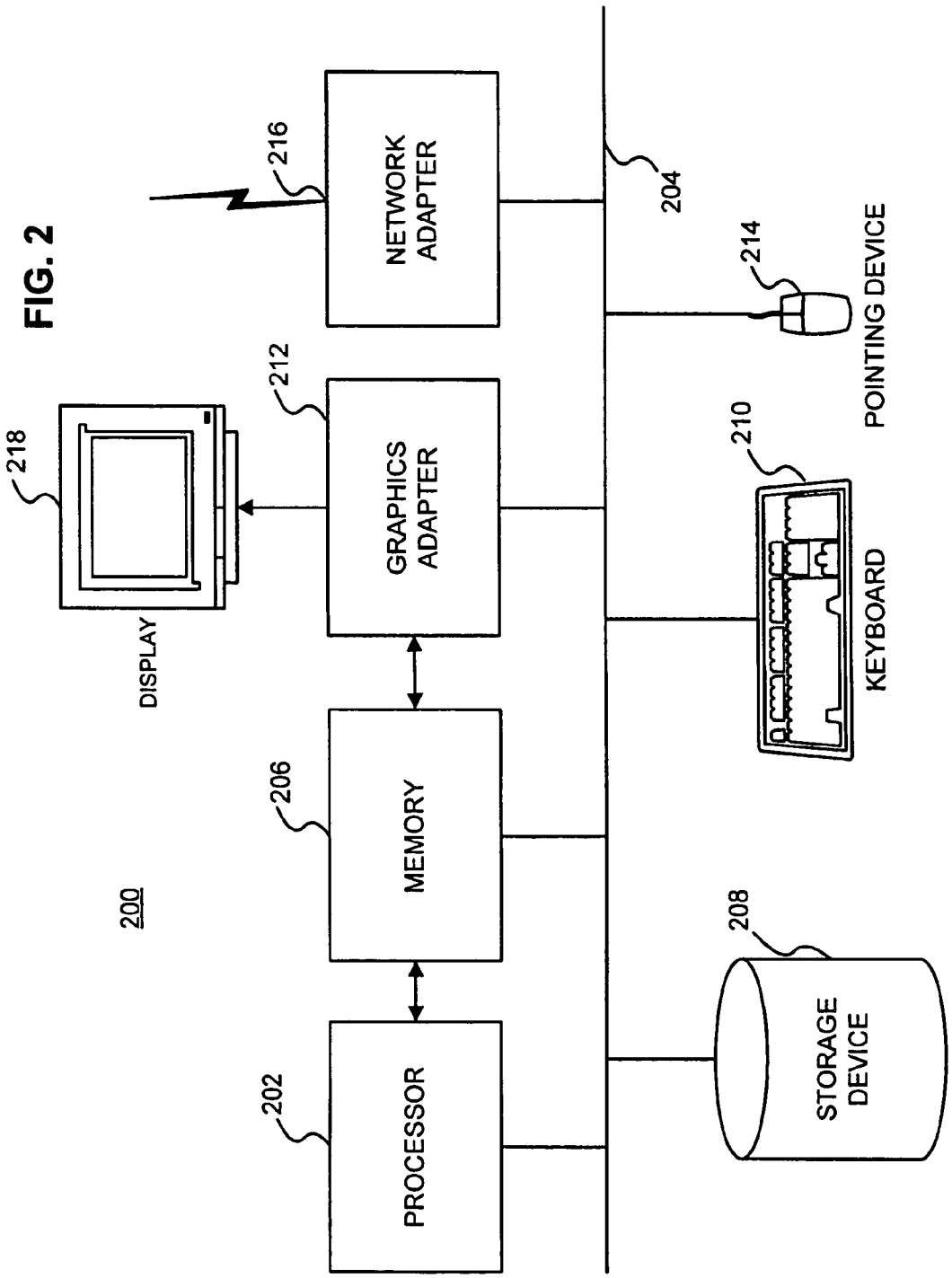
FIG. 2 is a high-level block diagram illustrating a functional view of a typical computer system acting as a client according to an embodiment of the present invention.

FIG. 2 is a high-level block diagram illustrating a functional view of a typical computer system 200 acting as a client 114 according to an embodiment of the present invention. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The storage device 208 is, in one embodiment, a computer-readable storage medium, such as a hard disk drive, a writeable compact disk (CD) or DVD, and/or a solid-state memory device. The storage device 208 stores multiple computer files. The pointing device 214 may be a mouse, track ball, or other type of pointing device, and is used in combination with the keyboard 210 to input data into the computer system 200. The graphics adapter 212 displays images and other information on the display 218. The network adapter 216 couples the security system 116 with the network 112.

As is known in the art, the computer system 200 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other modules. In addition, the embodiments may lack modules described herein and/or distribute the described functionality among the modules in a different manner. In one embodiment, the modules are stored on the storage device 208, loaded into the memory 206, and executed by the processor 202.

Figure 3:
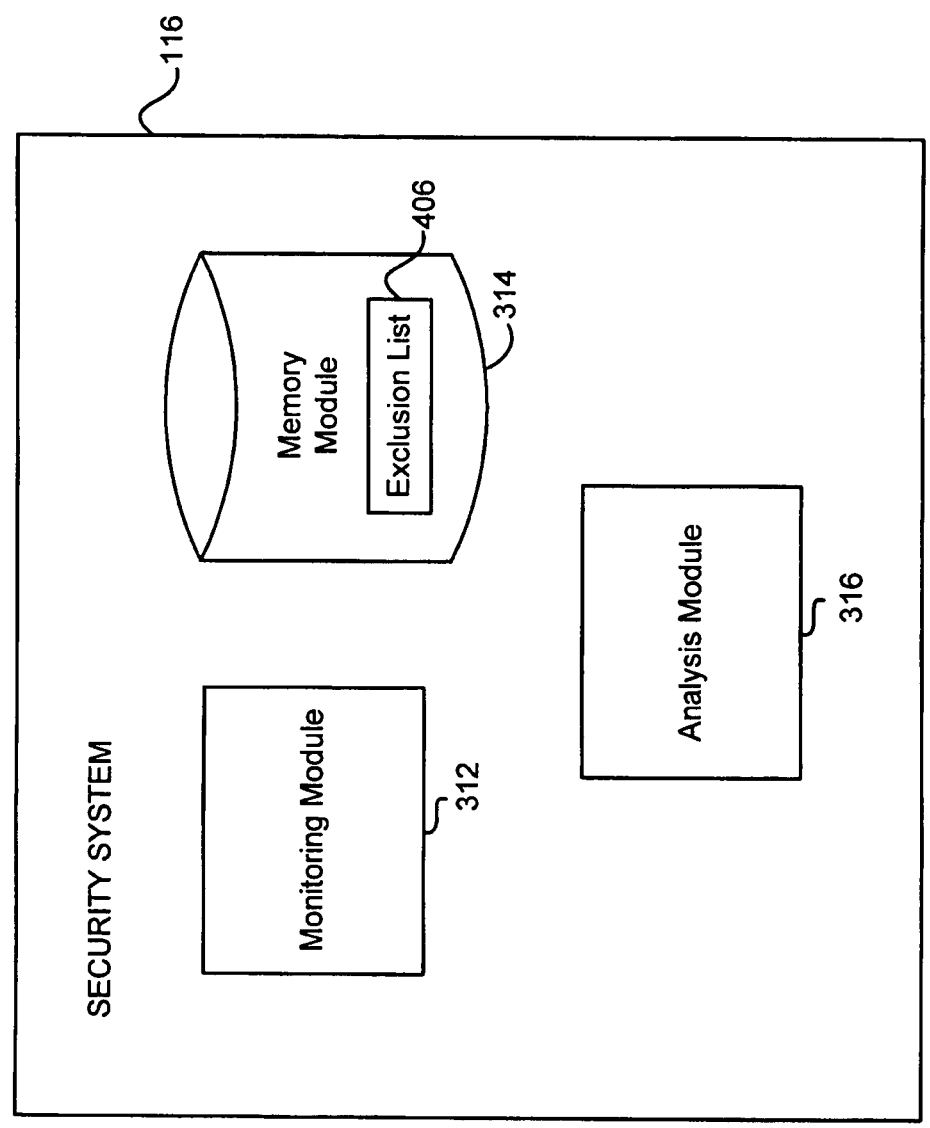
FIG. 3 is a high-level block diagram illustrating modules within a security system according to an embodiment of the present invention.

FIG. 3 is a high-level block diagram illustrating modules within the security system 116 according to an embodiment of the present invention. Those of skill in the art will understand that other embodiments of the security system 116 can have different and/or other modules than the ones described herein. In addition, the functionalities can be distributed among the modules in a manner different than described herein.

FIG. 3 illustrates a monitoring module 312, a memory module 314, and an analysis module 316. According to an embodiment of the invention, in response to the client 114 initiating a request to access a web site hosted on the server 110, the server 110 sends a web page corresponding to the request to the client 114 via the network 112 (e.g., using HTTP). Before the web page reaches the client 114, the security system 116 intercepts the web page to check it for malicious content.

Figure 4:
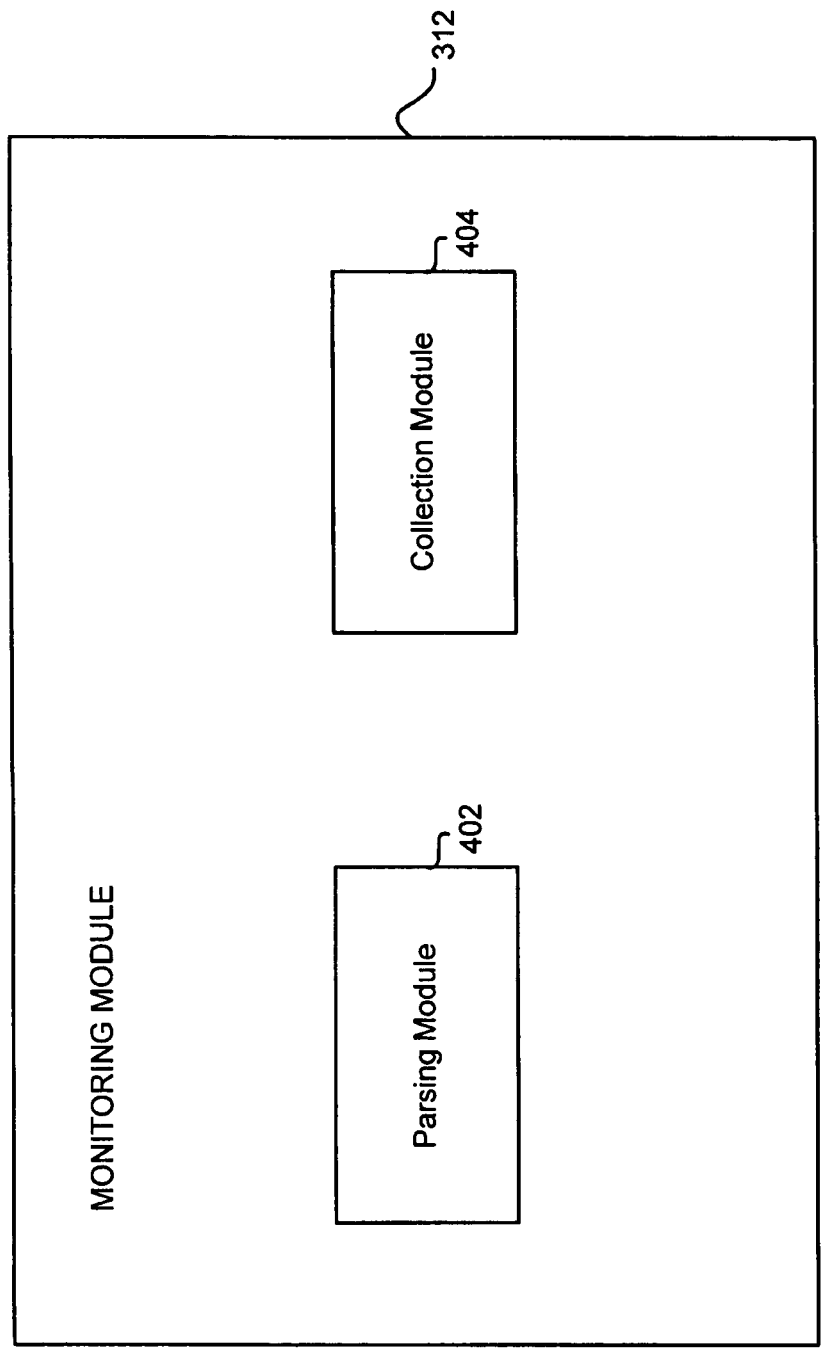
FIG. 4 is a high-level block diagram illustrating modules within a monitoring module according to an embodiment of the present invention.

The monitoring module 312 is configured to process the received web page to identify one or more frames (if any) embedded within the received web page. FIG. 4 is a high-level block diagram illustrating modules within the monitoring module 312 according to an embodiment of the present invention. Those of skill in the art will understand that other embodiments of the monitoring module 312 can have different and/or other modules than the ones described herein. In addition, the functionalities can be distributed among the modules in a manner different than described herein.

FIG. 4 illustrates a parsing module 402 and a collection module 404. The parsing module 402 identifies a frame (if any) embedded within the received web page. Specifically, the parsing module 402 is adapted to identify a frame tag within the received web page's syntax (e.g., in HTML). For example, the HTML syntax of an exemplary web page may be:

<HTML>
<HEAD>
</HEAD>
   <FRAMESET COLS="25%,75%">
   <FRAME SRC="label.htm">
   <FRAME SRC="info.htm">
   </FRAMESET>
<NOFRAMES>
Content
</NOFRAMES>
</HTML>

The parsing module 402 is adapted to parse this HTML code and locate one or more frame tags, namely, the <FRAME> tags within the <FRAMESET></FRAMESET> container. A frame tag may include information regarding a web page (e.g., its URL) framed within a parent window. The parsing module 402 further parses a frame tag in the HTML document to identify information regarding the frame, such as the framed page's URL. Thus, from this exemplary HTML document, the parsing module 402 is adapted to identify the URLs "label.htm" and "info.htm," both of which represent pages embedded within frames of the received web page.

In an embodiment of the invention, the collection module 404 collects identified information regarding frames (e.g., the framed pages' URLs) from each web page parsed by the parsing module 402 and creates an exclusion list 406 including the identified information. Thus, the exclusion list 406 may include a list of web pages that have been framed within pages processed by the monitoring module 312. The collection module 404 further provides the exclusion list 406 to the memory module 314 for storage. The collection module 404 is also adapted to collect information (e.g., URLs) from frame tags embedded within subsequent web pages analyzed by the parsing module 402. The collection module 404 then determines if a subsequently identified URL is already included in the exclusion list 406 stored in the memory module 314. If not, the collection module 404 updates the exclusion list 406 by adding the subsequently identified URL to the exclusion list 406. The exclusion list 406 is built dynamically and maintained per-user. The exclusion list 406 may operate as a least recently used ("LRU") cache that stores, for example, the last one hundred URLs that can legitimately appear within a frame.

In another embodiment of the invention, an administrator of a legitimate web site (e.g., hosted on the server 110) can send to the security system 116 the URLs of the web site's web pages that can legitimately appear within a frame. The security system 116 may then add the URLs received from the administrator to the exclusion list 406. In addition, a legitimate server may directly provide the exclusion list 406 to the memory module 314 for storage. Accordingly, the URLs or some other identifying information included in the exclusion list 406 represent web pages that can legitimately appear within a frame and thus do not need to be busted out of an enclosing frame by a frame-busting module.

Utilizing the exclusion list 406 stored in the memory module 314, the analysis module 316 provides protection for the client 114 against fraudulent web sites, such as web sites mimicking legitimate web sites to defraud users through phishing scams. The analysis module 316 uses data provided by the monitoring module 312 to detect phishing attacks. FIG. 5 is a high-level block diagram illustrating modules within the analysis module 316 according to an embodiment of the present invention. Those of skill in the art will understand that other embodiments of the analysis module 316 can have different and/or other modules than the ones described herein. In addition, the functionalities can be distributed among the modules in a manner different than described herein.

FIG. 5 illustrates a lookup module 502 and a modification module 504. The lookup module 502 identifies a URL of a web page intercepted by the security system 116. For example, this web page may be a "framed" page requested and downloaded by the client 114 in response to receiving a parent web page that includes one or more frame tags. The URLs associated with these frame tags may have already been added to the exclusion list 406 by the collection module 404. Alternatively, this intercepted web page may be a top-level "non-frame" page. The lookup module 502 accesses the memory module 314 to compare the URL of the intercepted web page with information stored in the exclusion list 406. In particular, the lookup module 502 is adapted to determine if the web page's URL is included in the exclusion list 406. If the lookup module 502 determines that the web page's URL is already included in the exclusion list 406, the analysis module 306 forwards the web page to the client 114 without any modification because this web page can legitimately appear within a frame.

However, if the lookup module 502 determines that the web page's URL is not included in the exclusion list 406, the modification module 504 is configured to modify the web page to protect the client 114 from fraudulent sites. Specifically, the modification module 504 modifies the web page such that it will not be loaded on the client 114 as a framed page. For example, the modification module 504 may insert a frame-busting module into the web page's HTML body (e.g., after the HTML body's head tag). Thus, the modification module 504 may insert the following exemplary frame-busting script into the HTML body:

<script>
if (window!=top) {top.location.href=location.href;}
</script>

The analysis module 316 then forwards the modified web page to the client 114.

In an embodiment of the invention, the client 114 attempts to load the modified web page added with the frame-busting module. The frame-busting module is adapted to determine if the web page is in a frameset. For example, the frame-busting module determines if the web page is not loaded in an outermost frame. If it is determined that the web page is in a frameset (i.e., not in an outermost frame), the web page is reloaded by the frame-busting module in an outermost frame. Alternatively, the frame busting module will redirect the client 114 to an administrator configured page, such as the home page of the legitimate web site or a page for reporting fraudulent activities. As a result, web pages that cannot legitimately appear within a frame will be forwarded to the client 114 after being inserted with a frame-busting module. Accordingly, malicious web sites are unable to frame such web pages to defraud a user. In addition, since the security system 116 dynamically tracks possible frames that a user may safely request and access, it does not break existing web applications. This dynamic tracking of possible frames provides frame-busting protection to users without a costly reconfiguration or revision of an existing web application.

The monitoring module 312 and the analysis module 316 can perform their functionalities on the same web page as it is being intercepted by the security system 116. Thus, while a web page is being intercepted, the monitoring module 312 can identify information regarding one or more frames within the web page and update the exclusion list 406 with the framed pages' URLs, and the analysis module 316 can identify the URL of this same web page and modify it (e.g., by inserting or adding a frame-busting module) if the URL of this web page is not included in the exclusion list 406. The monitoring module 312 and the analysis module 316 can operate on a web page simultaneously or at about the same time.

Figure 6A:
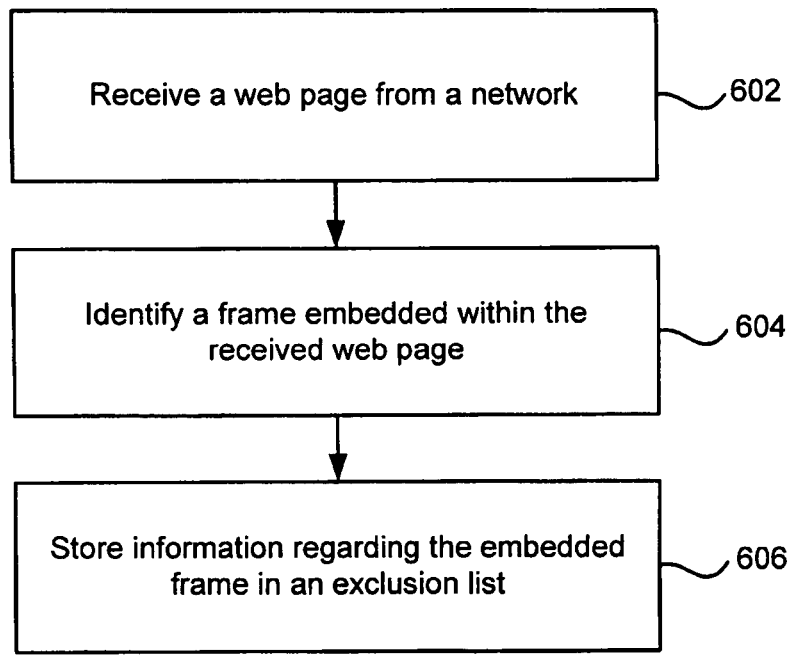
FIGS. 6A and 6B are flowcharts illustrating steps performed by a security system according to an embodiment of the present invention.
Figure 6B:
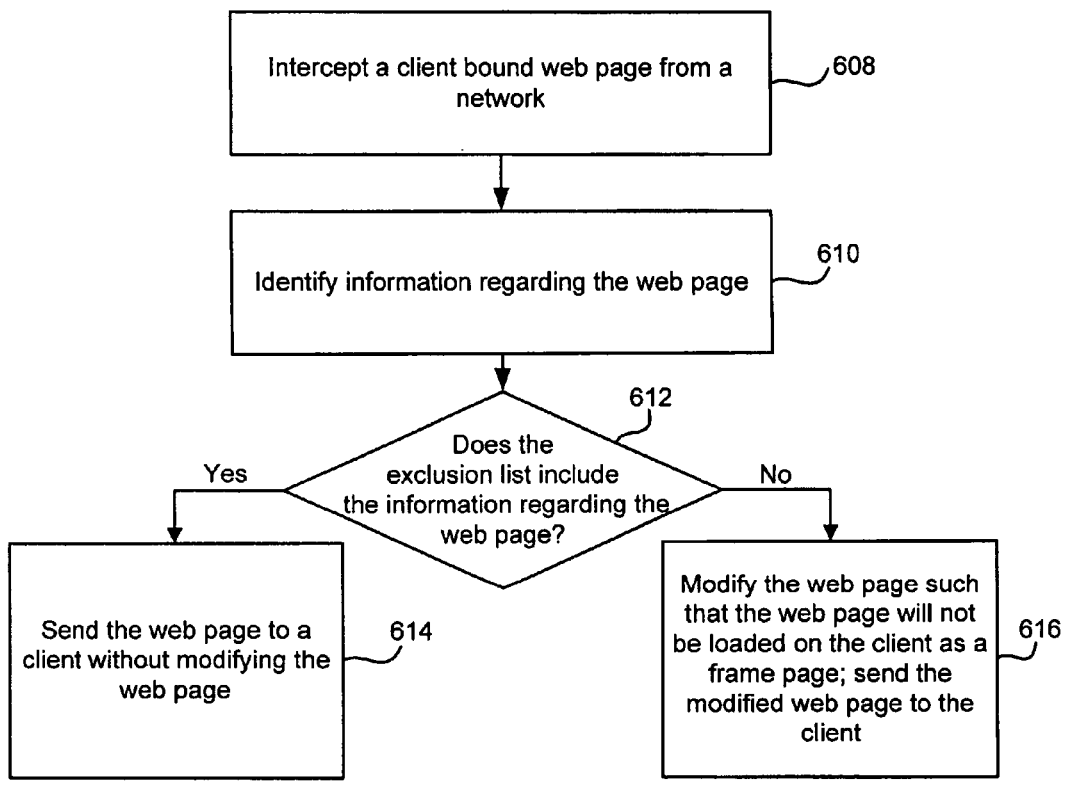

FIGS. 6A and 6B are flowcharts illustrating steps performed by the security system 116 according to an embodiment of the invention. The figure omits some possible steps. In addition, some embodiments perform different steps in addition to, or instead of, the ones described herein. Furthermore, the order of the steps can vary from that described herein.

As shown in FIG. 6A, the security system 116 establishes the exclusion list 406 identifying web pages that can legitimately appear within a frame. According to an embodiment of the invention, to establish the exclusion list 406, the monitoring module 312 receives 602 a web page from the network 112. The parsing module 402 identifies 604 a frame embedded within the received web page. For example, the parsing module 402 parses the web page's HTML syntax to identify a frame tag. The parsing module 402 further identifies information regarding the embedded frame, for example, by identifying a URL associated with the frame tag. The collection module 404 gathers the framed page's URL and creates the exclusion list 406 to maintain the URLs of web pages that can legitimately appear within a frame of another page. The memory module 314 stores 606 the exclusion list 406. In an alternative embodiment of the invention, the security system 116 establishes the exclusion list 406 by receiving the exclusion list 406 from a legitimate server for storage in the memory module 314.

As shown in FIG. 6B, the security system 116 dynamically prevents web pages that cannot be legitimately framed from appearing on the client 114 within a frame. The analysis module 316 intercepts 608 a client bound web page from the network 112. This web page may be a "non-frame" page or a "framed" page downloaded by the client 114 in response to receiving a page with frame tags. The lookup module 502 identifies 610 this web page's URL. The lookup module 502 further accesses the memory module 314 and determines 612 if the exclusion list 406 includes the identified URL of the web page. If the web page's URL is included in the exclusion list 406, the lookup module 502 sends 614 the web page to the client 114 without inserting a frame-busting module to the web page.

If the web page's URL is not included in the exclusion list 406, the modification module 504 modifies 616 the web page such that the web page will not be loaded on the client 114 as a framed page. For example, the modification module 504 is adapted to add a frame-busting module to the web page such that the web page will be busted out of any enclosing frame at the client 114. In an alternative embodiment, the modification module 504 may insert a frame busting module that redirects the client 114 to an administrator configured page, such as the home page of the legitimate web site or a page for reporting fraudulent activities. The modification module 504 further sends the modified web page to the client 114.

The above description is included to illustrate the operation of the preferred embodiments and is not meant to limit the scope of the invention. Where the description refers to "one" embodiment and/or "another" embodiment, it will be understood that the description is not necessarily referring to different embodiments. The scope of the invention is to be limited only by the following claims. From the above discussion, many variations will be apparent to one skilled in the relevant art that would yet be encompassed by the spirit and scope of the invention.

I claim:

1. A method of protecting a user of a client from computer frauds, comprising:
using a computer to perform steps comprising:
establishing an exclusion list identifying web pages that are legitimately framed;
identifying information regarding a first web page in a frameset of a second web page, the first and second web pages received from a network; and
modifying, if the identified information regarding the first web page is not included in the exclusion list, the first web page by inserting a frame-busting module in the first web page for loading the first web page outside the frameset of the second web page on the client.

2. The method of claim 1, wherein establishing the exclusion list comprises:
identifying one or more frames within one or more web pages received from the network; and
storing information regarding the identified one or more frames in a memory.

3. The method of claim 2, wherein identifying the one or more frames within the one or more web pages comprises:
parsing a syntax of the one or more web pages to identify a frame tag within the syntax; and
identifying a uniform resource locator associated with the frame tag.

4. The method of claim 3,
wherein storing the information regarding the identified one or more frames comprises:
storing the uniform resource locator associated with the frame tag in the memory; and
wherein identifying the information regarding the first web page received from the network comprises:
identifying a uniform resource locator of the first web page.

5. The method of claim 1, further comprising:
sending the first web page to the client without modifying the first web page if the identified information regarding the first web page is included in the exclusion list.

6. The method of claim 1, wherein establishing the exclusion list comprises:

receiving, from a server, uniform resource locators of the web pages that are legitimately framed; and storing the received uniform resource locators in a memory.

7. A system having a computer-readable storage medium having computer-executable code for protecting a user of a client from computer frauds, the computer-executable code comprising:

a memory module for storing an exclusion list identifying web pages that are legitimately framed;

a lookup module for identifying information regarding a first web page in a frameset of a second web page, the first and second web pages received from a network; and a modification module for modifying, if the identified information regarding the first web page is not included in the exclusion list, the first web page by inserting a frame-busting module in the first web page for loading the first web page outside the frameset of the second web page on the client.

8. The system of claim 7, further comprising:

a parsing module for identifying one or more frames within one or more web pages received from the network; and wherein the memory module is adapted to:

store information regarding the identified one or more frames in the exclusion list.

9. The system of claim 8, wherein the parsing module is adapted to:

parse a syntax of the one or more web pages to identify a frame tag within the syntax; and identify a uniform resource locator associated with the frame tag.

10. The system of claim 9, wherein the memory module is adapted to store the uniform resource locator associated with the frame tag in the exclusion list; and wherein the lookup module is adapted to identify a uniform resource locator of the first web page.

11. The system of claim 7, wherein the lookup module is adapted to send the first web page to the client without modifying the first web page if the identified information regarding the first web page is included in the exclusion list.

12. The system of claim 7, wherein the memory module is adapted to:

receive, from a server, uniform resource locators of the web pages that are legitimately framed; and store the received uniform resource locators in the exclusion list.

13. A computer-readable storage medium having embodied thereon executable program code for protecting a user of a client from computer frauds, the executable program code comprising:

a memory module for storing an exclusion list identifying web pages that are legitimately framed;

a lookup module for identifying information regarding a first web page in a frameset of a second web page, the first and second web pages received from a network; and a modification module for modifying, if the identified information regarding the first web page is not included in the exclusion list, the first web page by inserting a frame-busting module in the first web page for loading the first web page outside the frameset of the second web page on the client.

14. The computer-readable storage medium of claim 13, further comprising:

a parsing module for identifying one or more frames within one or more web pages received from the network; and wherein the memory module is adapted to:

store information regarding the identified one or more frames in the exclusion list.

15. The computer-readable storage medium of claim 14, wherein the parsing module is adapted to:

parse a syntax of the one or more web pages to identify a frame tag within the syntax; and identify a uniform resource locator associated with the frame tag.

16. The computer-readable storage medium of claim 15, wherein the memory module is adapted to store the uniform resource locator associated with the frame tag in the exclusion list; and wherein the lookup module is adapted to identify a uniform resource locator of the first web page.

17. The computer-readable storage medium of claim 13, wherein the lookup module is adapted to send the first web page to the client without modifying the first web page if the identified information regarding the first web page is included in the exclusion list.

18. The computer-readable storage medium of claim 13, wherein the memory module is adapted to:

receive, from a server, uniform resource locators of the web pages that are legitimately framed; and store the received uniform resource locators in the exclusion list.

* * * * *